(12) United States Patent
Komura et al.

(10) Patent No.: US 6,813,433 B2
(45) Date of Patent: Nov. 2, 2004

(54) METHOD FOR MANUFACTURING OPTICAL WAVEGUIDE AND OPTICAL WAVEGUIDE DEVICE, OPTICAL WAVEGUIDE DEVICE AND OPTICAL WAVEGUIDE, AND OPTICAL COMMUNICATION APPARATUS USING OPTICAL WAVEGUIDE DEVICE

(75) Inventors: Yoshiyuki Komura, Kyotanabe (JP); Kazuyuki Hayamizu, Kyotanabe (JP); Yukari Terakawa, Kyoto (JP); Toshinari Mori, Nara (JP); Hayami Hosokawa, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 10/619,263

(22) Filed: Jul. 14, 2003

(65) Prior Publication Data

US 2004/0013393 A1 Jan. 22, 2004

(30) Foreign Application Priority Data

Jul. 15, 2002 (JP) .......................................... 2002-206323

(51) Int. Cl.$^7$ ................................................ G02B 6/00
(52) U.S. Cl. ...................................... 385/137; 385/136
(58) Field of Search ........................... 385/50, 137, 147

(56) References Cited

U.S. PATENT DOCUMENTS

| | | | | |
|---|---|---|---|---|
| 6,061,487 A | * | 5/2000 | Toyama et al. ................ | 385/47 |
| 6,072,924 A | * | 6/2000 | Sato et al. ..................... | 385/18 |
| 2004/0062484 A1 | * | 4/2004 | Germann et al. ............. | 385/49 |

FOREIGN PATENT DOCUMENTS

| | | | |
|---|---|---|---|
| JP | 10-300956 | 11/1998 | ........... G02B/6/122 |
| JP | 10-319361 | 12/1998 | ........... G02F/1/035 |
| JP | 11-14845 | 1/1999 | ........... G02B/6/122 |
| JP | 11-311713 | 11/1999 | ........... G02B/6/122 |

OTHER PUBLICATIONS

Patent Abstracts of Japan, Publication No. 10–300956 dated Nov. 13, 1998 (2pgs.).
Patent Abstracts of Japan, Publication No. 10–319361 dated Dec. 4, 1998 (2 pgs.).
Patent Abstracts of Japan, Publication No. 11–014845 dated Jan. 22, 1999 (2 pgs.).
Patent Abstracts of Japan, Publication No. 11–311713 dated Nov. 9, 1999 (2 pgs.).

* cited by examiner

*Primary Examiner*—Phan T. H. Palmer
*Assistant Examiner*—Jennifer Doan
(74) *Attorney, Agent, or Firm*—Osha & May L.L.P.

(57) ABSTRACT

In an optical waveguide device, a rectangle, which uses a filter insertion groove as its diagonal line and uses points on filter insertion grooves adjacent to the above filter insertion groove as its apexes, is assumed as a unit rectangle, and the size of the optical waveguide device is set to an integer multiple of the unit rectangle. In this case, even if filter insertion grooves are formed in a state in which a plurality of the optical waveguide devices are disposed in matrix, the respective optical waveguide devices can be formed in the same shape. Further, the filter insertion grooves formed to the respective optical waveguide devices do not divide portions other than the target portion of other optical waveguide devices. Therefore, the manufacturing processes of the optical waveguide device can be simplified and are suitable for mass production, and manufacturing cost can be suppressed thereby.

7 Claims, 18 Drawing Sheets

METHOD FOR MANUFACTURING OPTICAL WAVEGUIDE AND OPTICAL WAVEGUIDE DEVICE, OPTICAL WAVEGUIDE DEVICE AND OPTICAL WAVEGUIDE, AND OPTICAL COMMUNICATION APPARATUS USING OPTICAL WAVEGUIDE DEVICE

BACKGROUND OF THE INVENTION

1. Field of the Invention

The present invention relates to an optical waveguide for propagating light in cores, to an optical waveguide device composed of an optical waveguide to which added are optical fiber guides for mounting optical fibers, optical components such as light emitting devices, light receiving devices, and the like, and functional portions such as optical device installing portions and optical modulation functions, and to a method of manufacturing the optical waveguide and the optical waveguide device, as well as to an optical communication apparatus using the optical waveguide device.

2. Description of the Background Art

Optical fiber cables used in optical communication employ an optical waveguide device at connecting portions and terminal ends so that the optical fiber cables can be connected to other optical fiber cables, light emitting devices, and light receiving devices. In recent years, as optical communications, which can transmit a large amount of data at a high speed, are increasingly used, it is desired to manufacture optical waveguide devices suitable for mass production at low cost.

There are optical transceivers as an example of an optical waveguide device for receiving an optical signal from an optical fiber and converting it into an electric signal and for converting an electric signal into an optical signal and transmitting the optical signal to an optical fiber. The optical transceiver is ordinarily composed of an optical waveguide substrate, on which an optical waveguide is formed, optical fibers connected to the cores of the optical waveguide, and a support substrate on which light emitting devices, light receiving devices, and the like are mounted. A filter insertion groove is formed midway of a core on the optical waveguide substrate so as to divide the core, and a filter, which has such characteristics that light having a particular wavelength range can be passed therein and light having other wavelength range is reflected thereby, is inserted into the filter insertion groove. A transmitting signal is separated from a received signal by the filter, and thereby, occurrence of crosstalk is prevented.

Conventionally, the optical waveguide devices are manufactured by individually manufacturing the optical waveguide substrates and the support substrates and bonding them to each other by a bonding agent one by one. Thus, a manufacturing process is complex and a long time and high cost are required to manufacture the optical waveguide devices. As a result, it is impossible to effectively manufacture the optical waveguide devices. Further, since the respective optical waveguide substrates and support substrates are minute components, it takes a long time and is expensive to assemble an optical waveguide device by aligning an optical waveguide substrate with a support substrate with a pinpoint accuracy.

Incidentally, productivity of the optical waveguide devices may be improved if they are manufactured in such a manner that a plurality of optical waveguide substrates and a plurality of support substrates are formed on wafers or mother substrates respectively at a predetermined interval, and after both the wafers or the mother substrates are joined to each other, the joined member is cut off to the respective optical waveguide devices. The production efficiency of the filter insertion grooves may be also improved by forming them at a time before the respective optical waveguide devices are cut off.

FIG. 1 shows a state in which a plurality of optical waveguide devices are formed. Optical waveguide devices 23 shown in FIG. 1 are composed of a plurality of support substrates 25, which are formed on a single mother substrate in a matrix, joined to a plurality of optical waveguide substrates 24 formed on another single mother substrate in the matrix. Although the optical waveguide substrates 24 are illustrated as if they are joined to the support substrates 25 in a discrete state, this is because unnecessary portions are not illustrated, and they are not cut off individually. Each optical waveguide substrate 24 has a core 26 that is cut off by a filter insertion groove 27. The filter insertion groove 27 is formed in the vicinity of the coupling portion of the core 26 formed in a T-shape, and a filter 28 is inserted in the filter insertion groove 27 so as to divide the core 26. The filter 28 separates a transmitting signal propagated in the core 26 from a received signal propagated therein.

The filter insertion groove 27 is formed in manner of making a cut by dicing. However, the dicing can only form grooves all over the mother substrate as shown in FIG. 1 and cannot form partial grooves only at portions where the filters 28 are inserted. Further, each filter insertion groove 27 is formed at a predetermined angle to the longitudinal direction of a core 26. Thus, if the filter insertion grooves 27 at predetermined positions of the respective optical wave guide devices 23 are formed, dicing pitches may not be set constant or positions 29 other than the targets positions of the cores 26 of other optical waveguide devices 23 disposed side by side may be divided depending upon the size of the respective optical waveguide devices 23 and the length of the cores 26. Accordingly, the respective optical waveguide devices 23 cannot be manufactured in the same shape.

An object of the present invention is to provide a method for manufacturing an optical waveguide device, in which respective optical waveguide devices can be obtained in the same shape from a substrate or the like and filter insertion grooves formed thereto do not cross undesired portions of the cores of other optical waveguide devices.

Note that although the filter insertion grooves 27 are illustrated in a width smaller than that of the filters 28 in FIG. 1 for the sake of convenience, actually, the width of the filter insertion grooves 27 are larger than that of the filters 28, and the filters 28 are inserted therein. Further, it is observed as if the filter insertion grooves 27 are formed also on the support substrates 25 other than the optical waveguide substrates 24, the portions of grooves 27 on the support substrates 25 show traces of a dicing blade. Since it is sufficient to form the filter insertion grooves 27 in a depth by which the cores 26 of the optical waveguide substrates 24 are completely divided, actually, the filter insertion grooves 27 are not formed up to the support substrates 25.

SUMMARY OF THE INVENTION

In a method of manufacturing an optical waveguide device according to a first aspect of the invention, comprising the steps of forming a plurality of optical waveguides, each of which comprises cores each having at least one branch point and passing and propagating light and clads surrounding the cores, on a first substrate in matrix at predetermined intervals longitudinally and laterally, forming a plurality of functional portions on a second substrate in matrix at predetermined intervals longitudinally and laterally similarly to the optical waveguides, bonding the first substrate to the second substrate and integrating them such that the optical waveguides face the functional portions, forming grooves, into which filters for passing or reflecting light having passed through or propagated in the cores according to the wavelength thereof can be inserted, at least at positions where the light reflected by a filter inserted into a groove at a branch point is propagated to a core extending in a different direction from the branch point, and thereafter cutting off the first and second substrates having been integrated to respective chips to thereby manufacture the optical waveguide device, the method further comprises the step of determining the disposing distances of the respective optical waveguide devices disposed in matrix, the lengths of the cores, and the forming distance of the filter insertion grooves so that the following relationships are satisfied.

$$x = m \cdot p / \sin \theta \; (m = \text{natural number of at least } n)$$

$$y = p / \cos \theta$$

$$z \leq (n+1) \cdot p / \sin \theta$$

where the distance in a longitudinal direction of the disposing distances is shown by x, the distance in a lateral direction thereof is shown by y, the length of the cores formed in a direction parallel with the longitudinal direction is shown by z, the number of the branch points of each core is shown by n, the forming distance of the filter insertion grooves is shown by p, and the inclination of the filters with respect to the longitudinal direction is shown by $\theta$ ($0° < \theta \; 90°$)

In a method of manufacturing an optical waveguide according to a second aspect of the invention comprising the steps of forming a plurality of optical waveguides, each of which comprises cores each having at least one branch point and passing and propagating light and clads surrounding the cores, on a first substrate in matrix at predetermined intervals longitudinally and laterally, forming grooves, into which filters for passing or reflecting light having passed through or propagated in the cores according to the wavelength thereof can be inserted, at least at positions where the light reflected by a filter inserted into a groove at a branch point is propagated to a core extending in a different direction from the branch point, and thereafter cutting off the first substrate to respective chips to thereby manufacture the optical waveguide device, the method further comprises the step of determining the disposing distances of the respective optical waveguide devices disposed in matrix, and the forming distance of the filter insertion grooves so that the following relationships are satisfied.

$$x = n \cdot p / \sin \theta$$

$$y = p / \cos \theta$$

where the distance in a longitudinal direction of the disposing distances is shown by x, the distance in a lateral direction thereof is shown by y, the number of the branch points of each core is shown by n, the forming distance of the filter insertion grooves is shown by p, and the inclination of the filters with respect to the longitudinal direction is shown by $\theta$ ($0° < \theta < 90°$)

According to the method of manufacturing the optical waveguide device of the first aspect of the invention, when the filter insertion grooves are formed by dicing in the state in which the plurality of optical waveguide devices are formed on the first substrate, the functional portions are formed on the second substrate, and the first substrate is bonded to the second substrate, the respective optical waveguide devices can be formed in the same shape, and the filter insertion grooves formed to the respective optical waveguide devices are not divided at portions other than the target portions of the cores. Further, since the filter insertion grooves can be formed by setting a dicing pitch constant, the plurality of filter insertion grooves can be formed by automatically moving a dicing blade in the same process. Accordingly, it is not necessary to form the filter insertion groove to each of the optical waveguide device in a separate process, thereby the manufacturing process of the optical waveguide device can be greatly simplified and a manufacturing efficiency can be enhanced.

The manufacturing method of the optical waveguide according to the second aspect of the invention can achieve an effect similar to that of the effect of the first aspect of the invention except that the second substrate is not provided by the manufacturing method of the second aspect.

An inexpensive optical waveguide device having stable quality can be manufactured by the manufacturing method of the optical waveguide device according to the first aspect of the invention.

Further, there can be obtained an optical communication apparatus for converting an optical signal into an electric signal which comprises the optical waveguide device according to a modification of the third aspect of the invention, a light emitting device drive circuit for driving a light emitting device mounted on the optical waveguide device, and a data processing circuit for processing an electric signal output from a light receiving device mounted on the optical waveguide device.

BRIEF DESCRIPTION OF THE DRAWINGS

FIGS. 11, 12, 13, 14, 15, 16, and 17 show views explaining a method of manufacturing the optical waveguide device according to an embodiment of the present invention.

FIG. 12 shows a view continued from FIG. 11.

FIG. 13 shows a view continued from FIG. 12.

FIG. 15 shows a view continued from FIG. 13.

FIG. 16 shows a view continued from FIG. 15.

FIG. 17 shows a view continued from FIG. 16.

DESCRIPTION OF THE INVENTION

Figure 1:
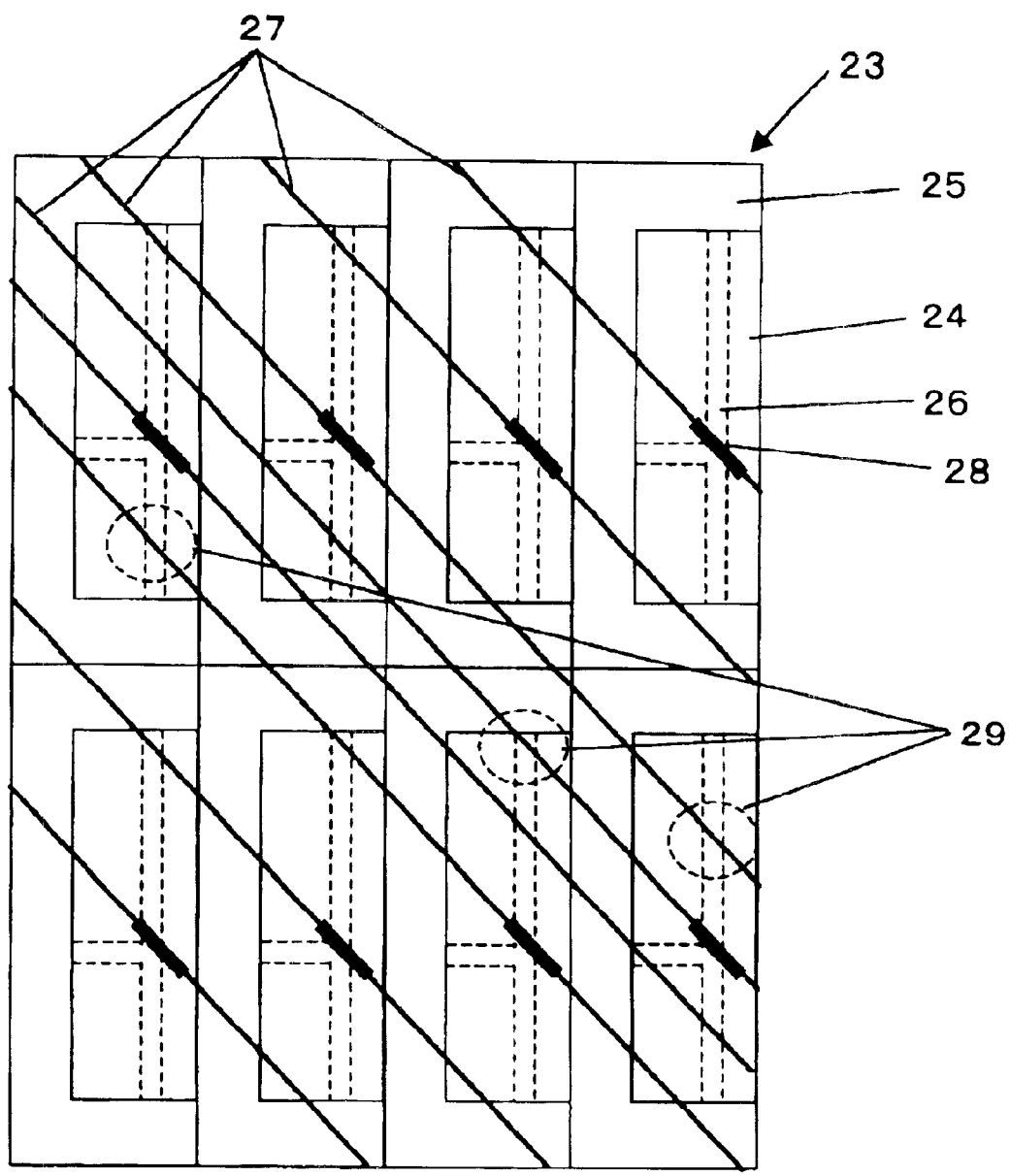
FIG. 1 shows a view illustrating a state in which filter inserting grooves of a conventional optical waveguide device is formed.
Figure 2:
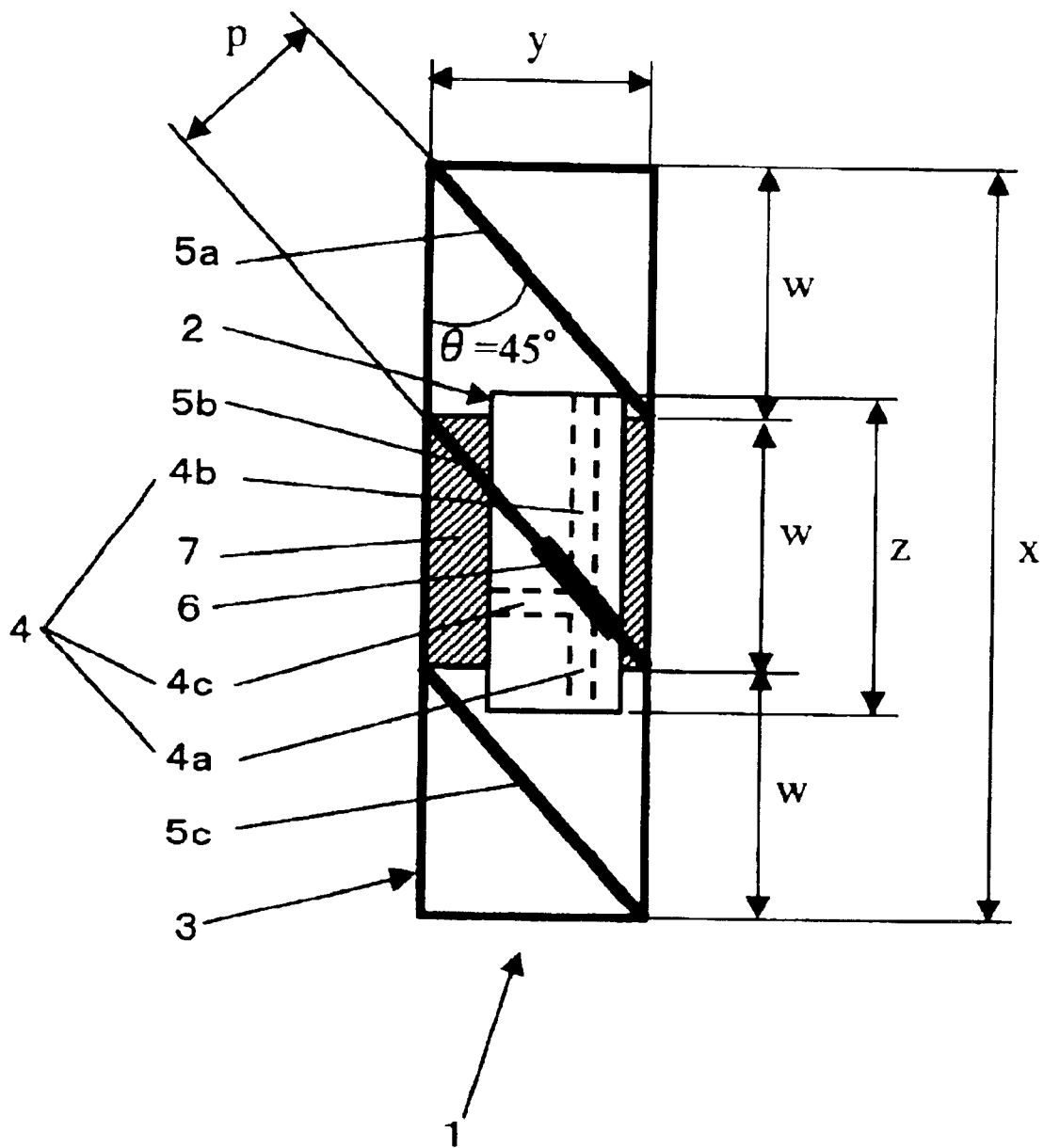
FIG. 2 shows a schematic view illustrating a main portion of an optical waveguide device according to an embodiment of the present invention.

FIG. 2 shows a schematic view of a main portion of an optical waveguide device (optical transceiver) 1 as an embodiment of the present invention when it is viewed from above. The optical waveguide device 1 of FIG. 2 shows one of a plurality of optical waveguide devices manufactured by a manufacturing method according to the present invention. The optical waveguide device 1 is composed of a rectangular optical waveguide substrate 2 corresponding to one of a plurality of optical waveguides formed in a matrix on a first substrate, a rectangular support substrate 3 corresponding to one of a plurality of functional portions formed in a matrix on a second substrate, filter insertion grooves 5a, 5b, and 5c, and a filter 6. The support substrate 3 that are formed at a forming distance x in a long side direction and at a forming distance y in a short side direction and cut off individually by dicing. Accordingly, the lengths of the long side and the short side of each rectangular supporting substrate 3 having been cut off is shorter by the width of the a dicing blade when measured accurately. In the following description, however, it is assumed that the long side length and the short side length of each rectangular supporting substrate 3 are set to the forming distances x and y for the sake of convenience.

The optical waveguide substrate 2 whose long and short sides are shorter than those of the support substrate 3 is joined to the support substrate 3 at the vicinity of the center of the support substrate 3 so that the long and short sides of the optical waveguide substrate 2 do not protrude from the support substrate 3. Therefore, the lengths of the long and short sides of the support substrate 3 are equal to those of the optical waveguide device 1. The long side direction of the optical waveguide substrate 2 is in parallel with the long side direction of the support substrate 3, and the length of them in the long side direction is z. A T-shape core 4 is formed on the optical waveguide substrate 2. The respective end surfaces of the core 4 are exposed from the optical waveguide substrate 2. The core 4 is composed of cores 4a and 4b, which are formed in a direction parallel with the long side direction of the support substrate 3, and a core 4c formed so as to be branched from the core 4a in a direction perpendicular to the cores 4a and 4b. A filter insertion groove 5b, which is at an angle θ=45° to the long side direction of the support substrate 3, is formed so as to divide the cores 4a and 4b in the vicinity of the branch portion of the cores 4a and 4c. Filter insertion grooves 5a and 5c are formed in parallel with the filter insertion groove 5b from the filter insertion groove 5b at a dicing pitch p. The filter insertion grooves 5a and 5c do not divide the core 4. The filter 6 is inserted into the filter insertion groove 5b so as to cross the cores 4a and 4b. The filter 6 passes or reflects the light having propagated in the core 4a depending on its wavelength. The light passed through the filter 6 propagates in the core 4b, and the light reflected by the filter 6 propagates in the core 4c. It is not necessary to insert the filter 6 into the filter insertion grooves 5a and 5c having no core.

Accordingly, the number of filter n equals 1. A not shown bench (electrode pads), on which a light emitting device and a light receiving device are mounted, and an optical fiber guide are formed at the portions, which are exposed and to which the optical waveguide substrate 2 is not joined, on the support substrate 3.

In the optical waveguide device 1, assuming a rectangle 7 (a hatched portion in FIG. 2 which will be hereafter referred to as "unit rectangle"), which uses the filter insertion groove 5b as its diagonal line and points on the filter insertion grooves 5a and 5c adjacent to the filter insertion groove 5b as its apexes, the size of the optical waveguide device 1 is about three times that of the unit rectangle 7. When the longitudinal length of the unit rectangle 7 is shown by w, the lateral length of the unit rectangle 7 as described above is y, and the filter insertion grooves 5a and 5c do not divide the cores 4. Accordingly, the following relationships are established.

$$w = p/\sin\theta \quad (1)$$

$$y = p/\cos\theta \quad (2)$$

$$x = 3w = (n+2)w \quad (3)$$

$$z = \leq 2w = (n+1)w \quad (4)$$

Figure 3:
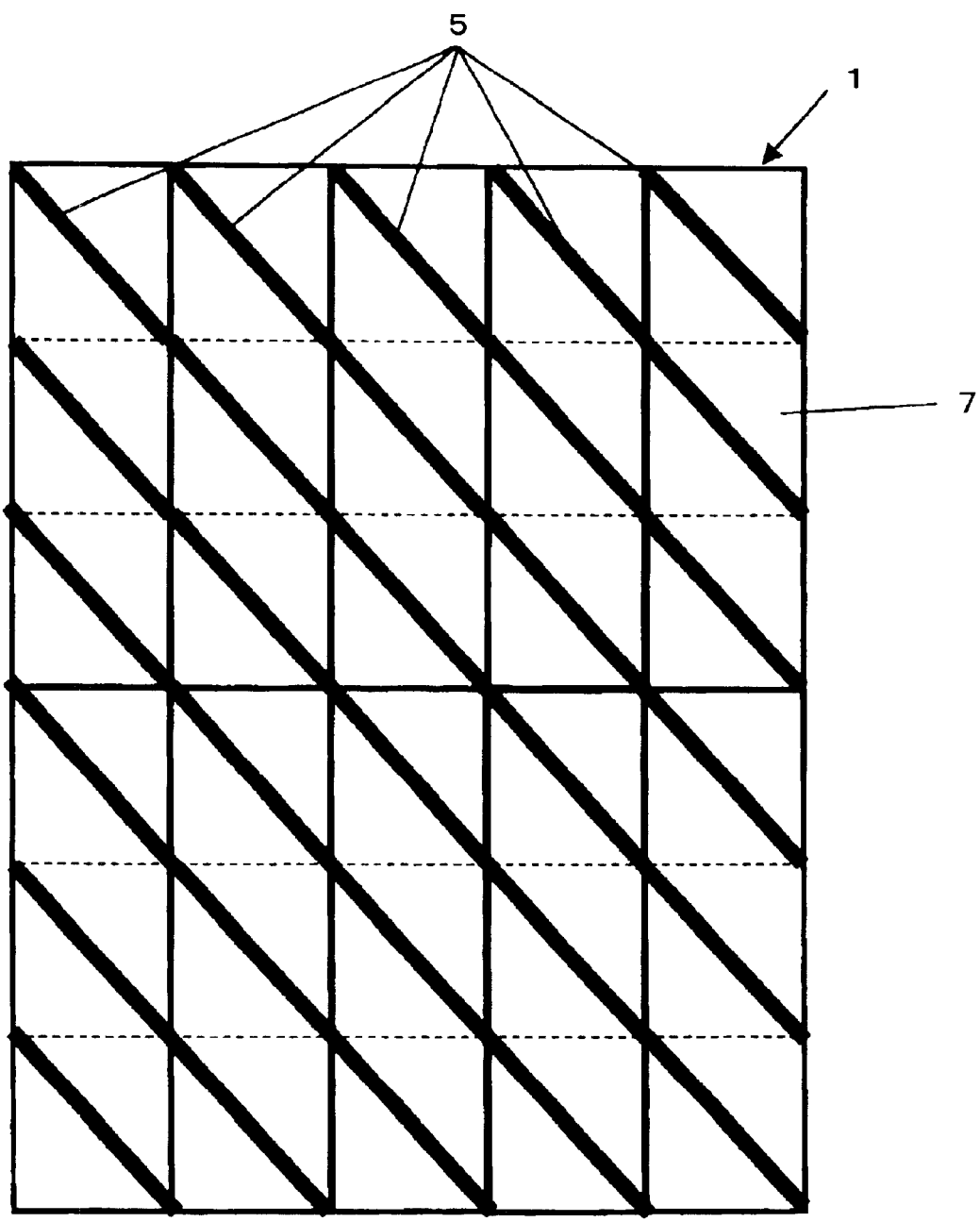
FIG. 3 shows a schematic view illustrating a state in which a plurality of the optical waveguide devices according to an embodiment of the present invention are formed.

If the size of the optical waveguide device 1 is set to an integer multiple of the unit rectangle 7 (three times in the FIG. 2), the filter insertion grooves 5 are formed at the same positions of the respective unit rectangles 7. Accordingly, even if the plurality of optical waveguide devices 1 are disposed in matrix as shown in FIG. 3, the respective optical waveguide devices 1 can be formed in the same shape, which permits the optical waveguide devices 1 to be manufactured in volume.

Note that although the filter insertion grooves 5 are illustrated in FIGS. 2 to 7 as if they are formed on the support substrate 3 at the portions other than the optical waveguide substrates 2, they show traces of a dicing blade. As it is sufficient to form the filter insertion groove 5 in a depth by which the core 4 of the optical waveguide substrate 2 is completely divided, actually, the filter insertion groove 5 is not formed up to the supporting substrate 3.

Further, in FIGS. 3 to 7, the boundaries between the unit rectangles 7 are shown by broken lines to illustrate the unit rectangles 7.

Figure 4:
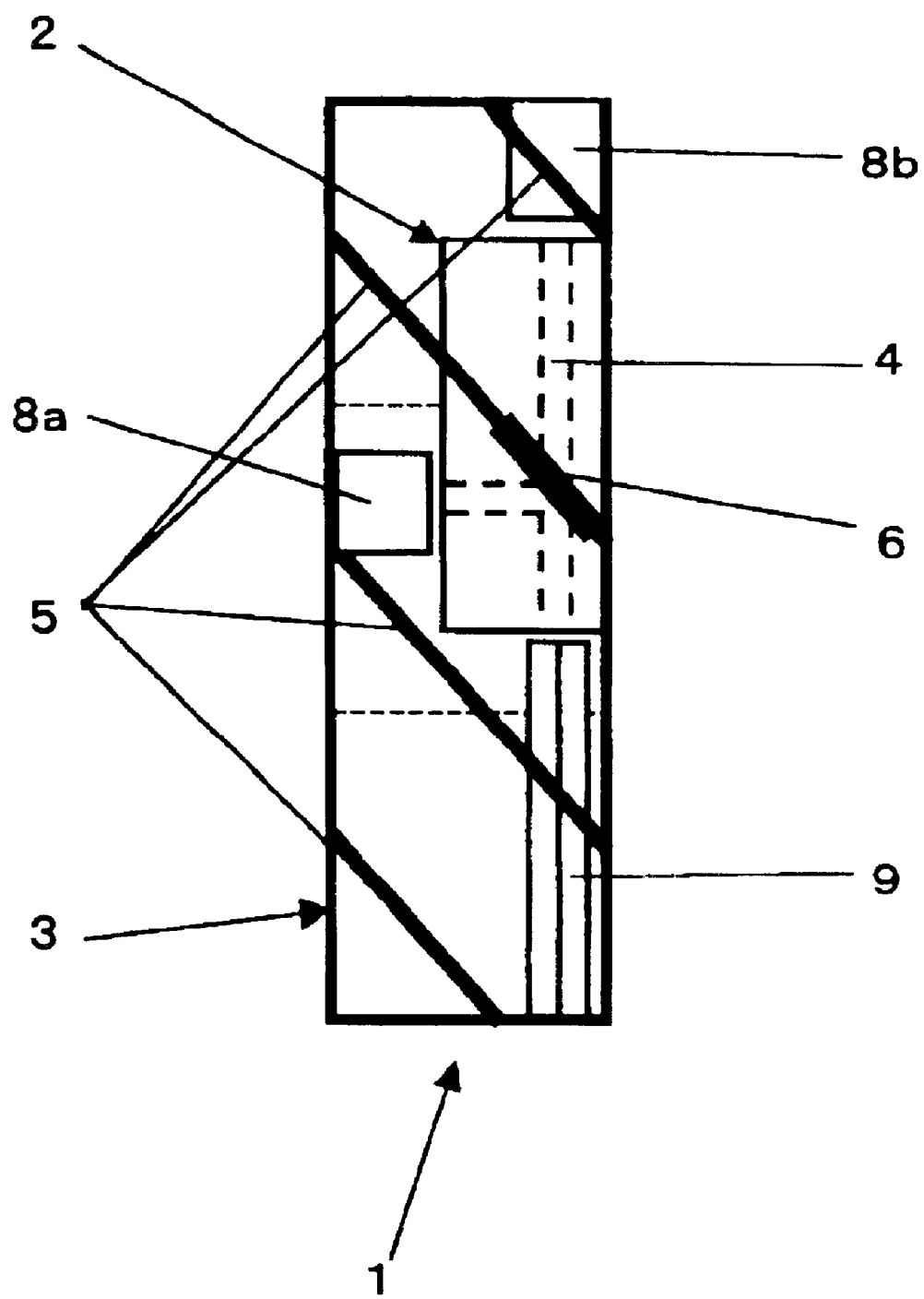
FIG. 4 shows a schematic view illustrating an optical waveguide device according to an embodiment of the present invention.
Figure 5:
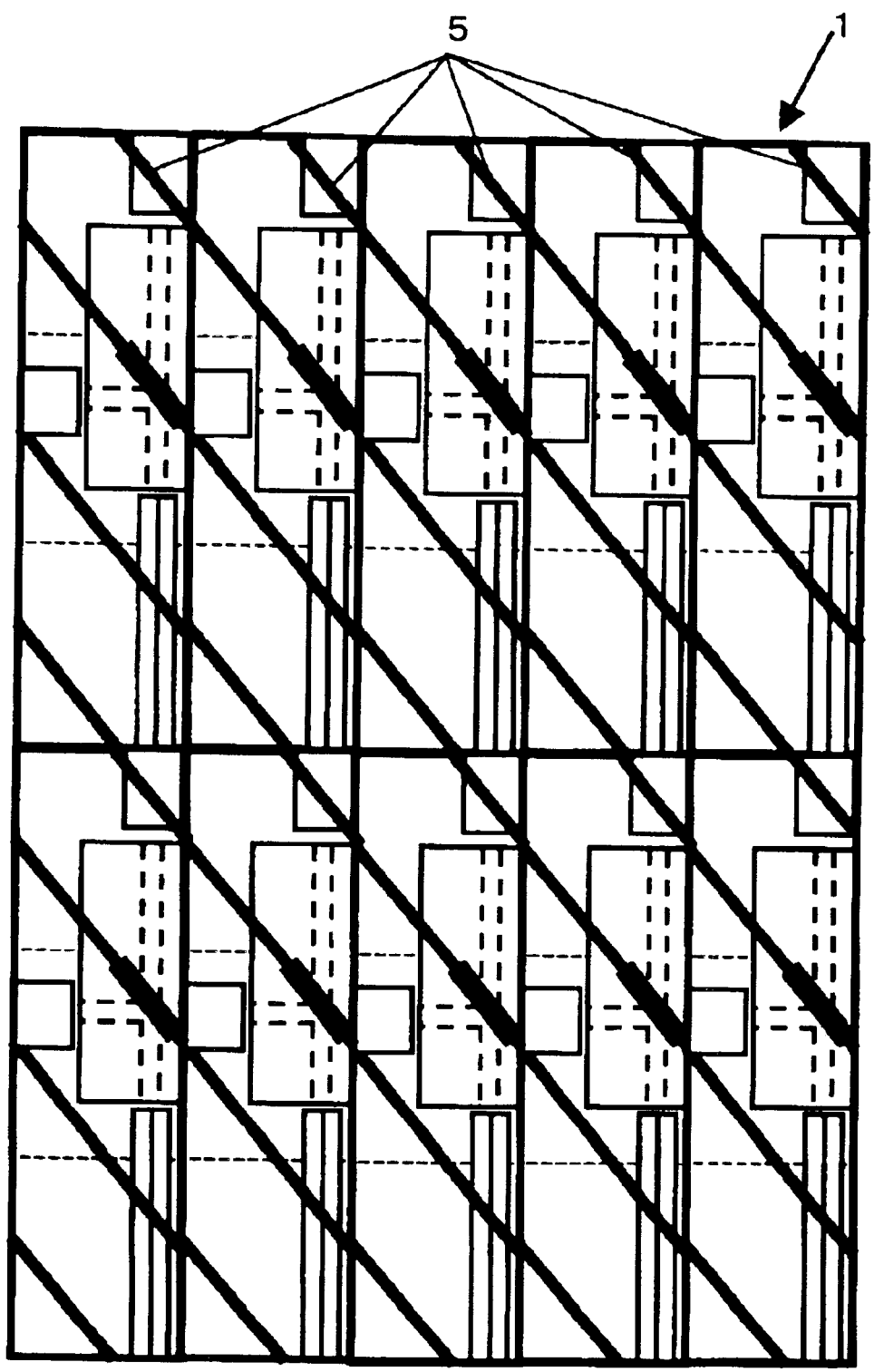
FIG. 5 shows a schematic view illustrating a state in which a plurality of the optical waveguide devices according to an embodiment of the present invention are formed.

FIG. 4 shows a schematic view illustrating an actual optical waveguide device 1 when it is viewed from above, and FIG. 5 shows a view in which a plurality of the optical waveguide devices 1 in FIG. 4 are disposed. Actually, the optical waveguide device is different from that shown in FIG. 2. That is, it is necessary to provide spaces for forming a light receiving device mounting bench 8a and a light emitting device mounting bench 8b and a space for forming an optical fiber guide 9. Therefore, the optical waveguide substrate 2 is joined to the support substrate 3 by being displaced from the center of the support substrate 3. However, as long as the size of the optical waveguide device 1 is set to an integer multiple of the unit rectangle 7, even if the plurality of optical waveguide devices 1 are disposed in a matrix, the filter insertion grooves 5 are formed at the same position of the respective optical waveguide devices 1. Accordingly, the optical waveguide devices 1 of the same shape can be manufactured in volume. Thus, when the filter insertion grooves 5 of the respective optical waveguide devices 1 are formed, they do not divide the cores 4 at portions other than the target portions.

Figure 6:
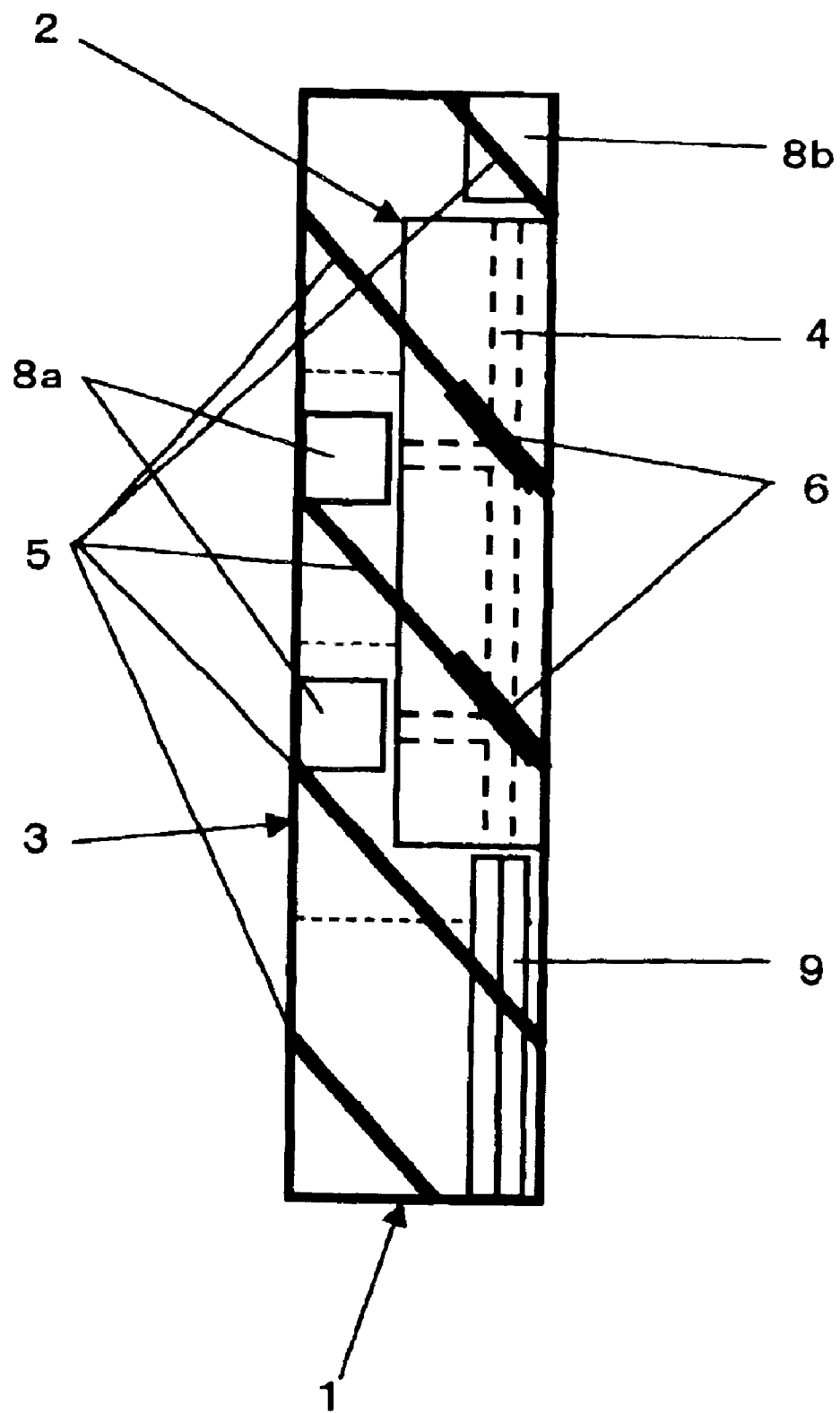
FIG. 6 shows a schematic view illustrating an optical waveguide device according to another embodiment of the present invention.

Further, if two filters are mounted as shown in FIG. 6, this arrangement can be designed by setting the size of the optical waveguide device 1 to four times that of the unit rectangle 7.

Figure 7:
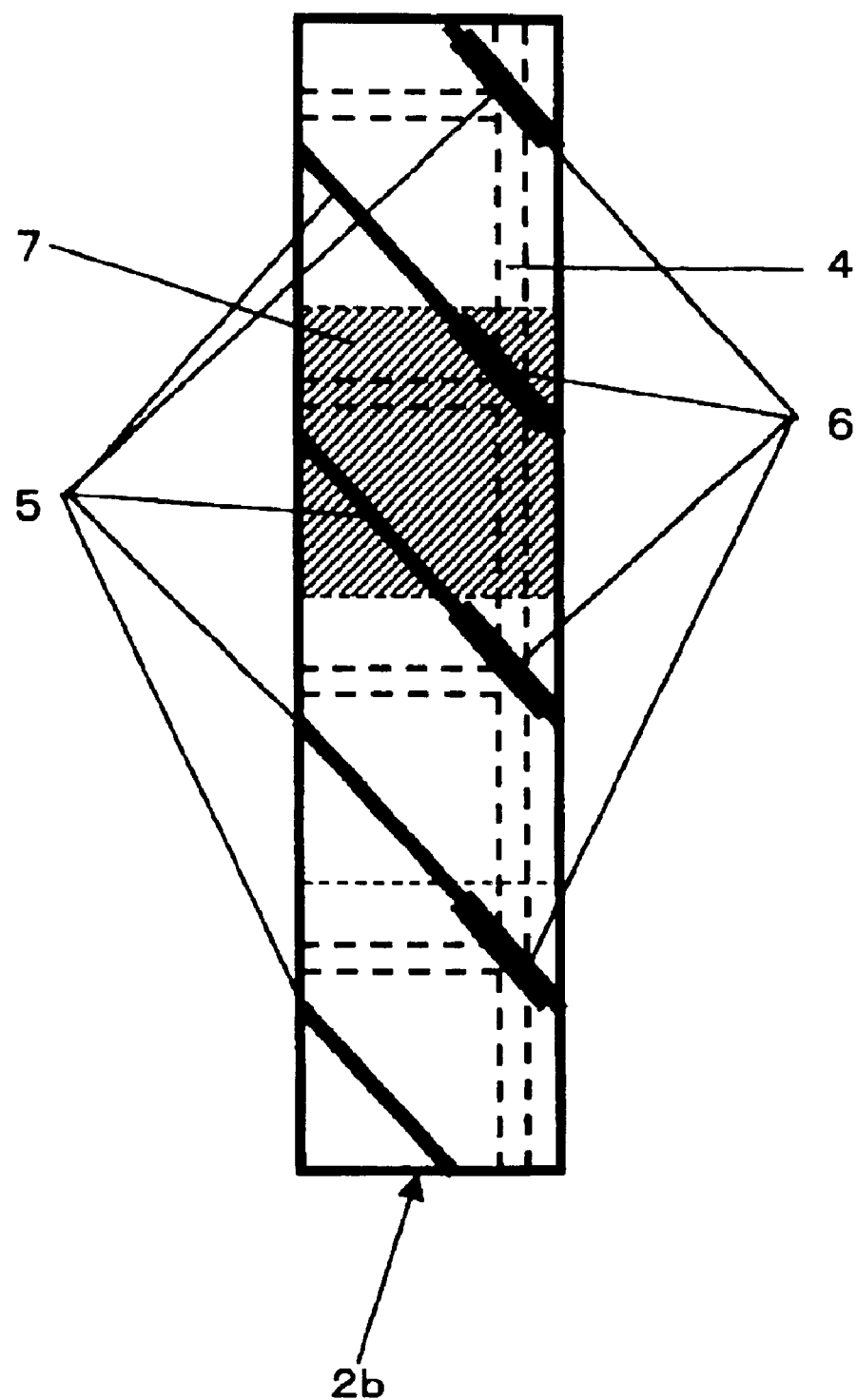
FIG. 7 shows a schematic view illustrating an optical waveguide according to an embodiment of the present invention.

FIG. 7 shows a schematic view of an optical waveguide (light multiplexing/demultiplexing device) 2b that is formed of only an optical waveguide substrate 2 without a support substrate. This invention can apply to determining the size of the light multiplexing/demultiplexing device 2b as well. There are slightly differences in that z and x have the same value. This is because it is not necessary to take spaces for forming a device mounting bench, a fiber guide, and the like into consideration because of no support substrates, and because filters 6 are inserted into all filter insertion grooves 5 in all unit rectangles 7. The light multiplexing/demultiplexing devices 2b having the same shape can be manufactured in volume because of setting the size of the light multiplexing/demultiplexing device 2b to an integer multiple of the unit rectangle 7, and filter insertion grooves 5 formed in the light multiplexing/demultiplexing devices 2b do not divide cores 4 at portions other than target portions. Further, as the cores 4 and the filter insertion grooves 5 having the same shape are formed in all the unit rectangles 7, light multiplexing/demultiplexing devices each having a minimum size can be obtained by changing positions where they are cut off according to the number of lights to be multiplexed and demultiplexed (i.e., number of filters).

Figure 8:
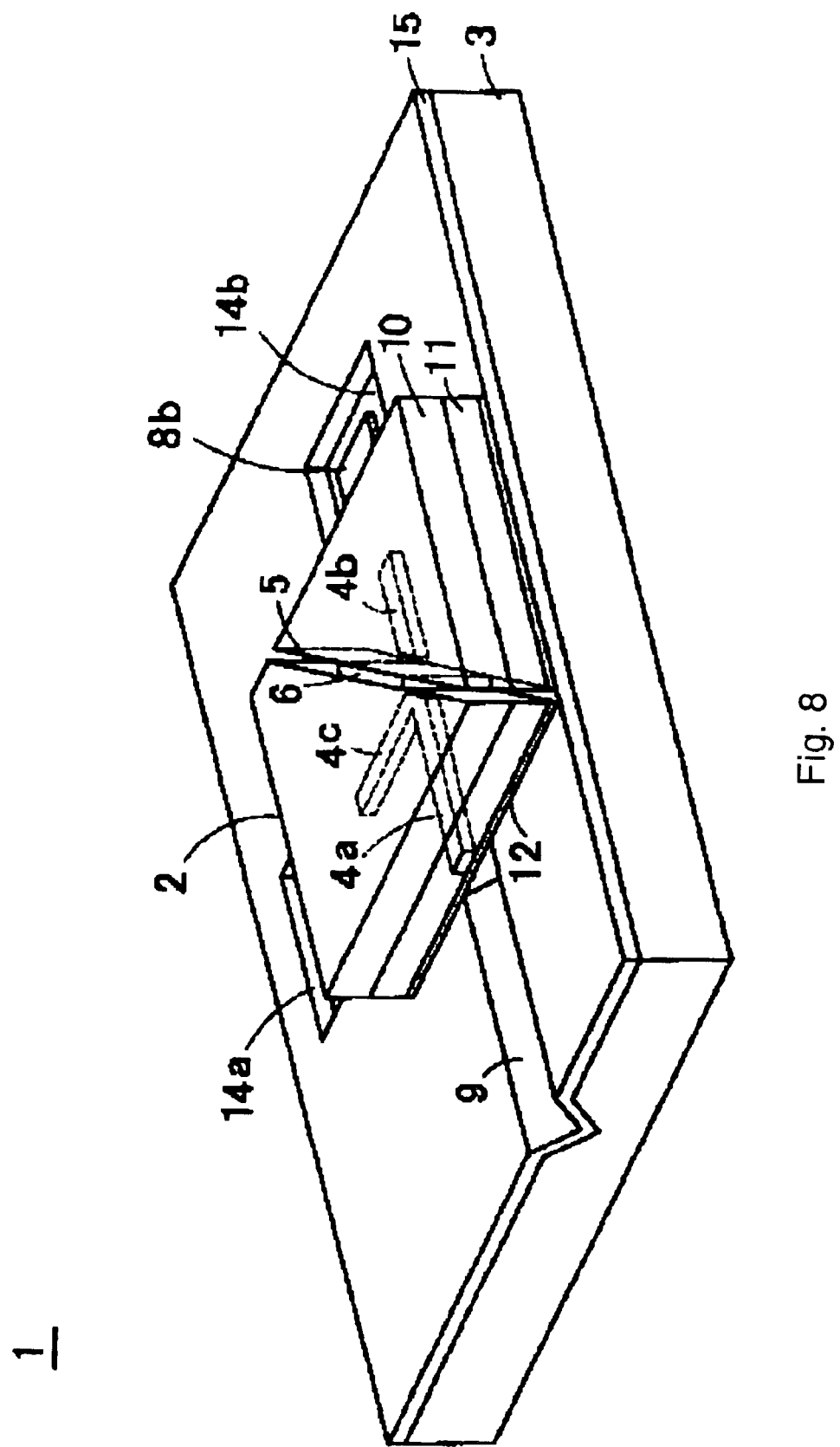
FIG. 8 is a schematic perspective view of an optical waveguide device according to an embodiment of the present invention.
Figure 9:
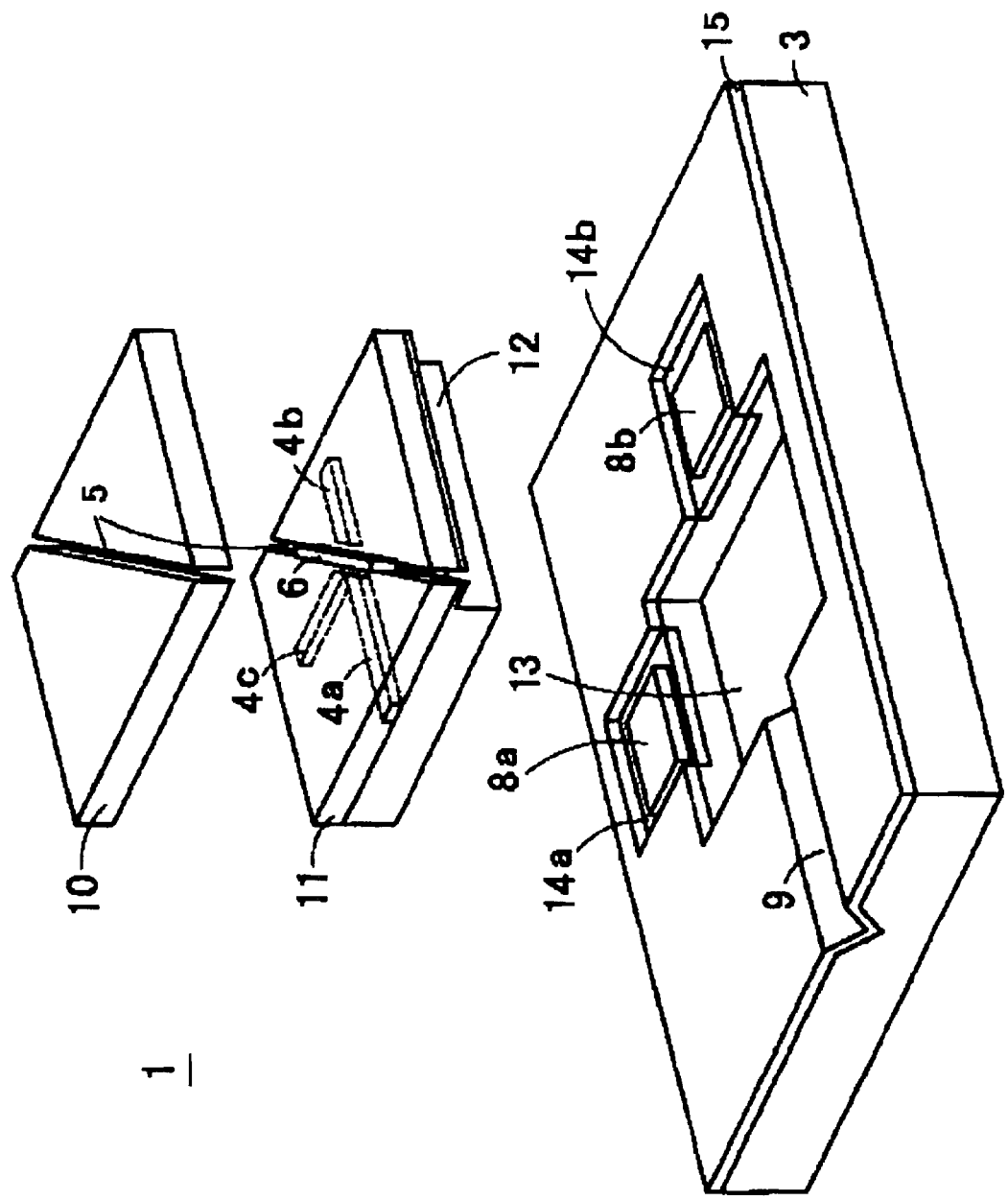
FIG. 9 shows a schematic exploded view of the optical waveguide device shown in FIG. 8.

FIGS. 8 and 9 show a schematic perspective view and a schematic exploded perspective view of an optical waveguide device (optical transceiver) 1 as an embodiment of the present invention. The optical waveguide device 1 of the embodiment is composed in joining an optical waveguide substrate 2 to a support substrate 3. The optical waveguide substrate 2 is composed of a cover glass 10, a lower cladding layer 11, which is made of an optical material having a high refractive index, cores 4a, 4b, and 4c, which are made of an optical material having a refractive index higher than that of the lower cladding layer 11, and which transmits light therein, an upper cladding layer 12 made of the same optical material as that of the lower cladding layer 11, and a filter 6. The outer shape of the optical waveguide substrate 2 is smaller than that of the support substrate 3. The filter 6 is an optical element, which is capable of passing only light in a particular wavelength range therethrough and reflecting light other than the particular wavelength range. The filter is inserted into the filter insertion grooves 5. Cores 4a and 4b embedded in the lower cladding layer 11 are aligned. The filter 6 is inserted at an angle of 45° to the lengthwise direction of the cores 4a and 4b so as to partition both the cores 4a and 4b, and a core 4c. The core 4c is disposed at a side of the filter 6 at an angle of 90° to the longitudinal direction of both the cores 4a and 4b.

The support substrate 3 has a ratio of a long side to a short set to 3:1. An optical waveguide fixing region 13, on which the optical waveguide substrate 2 is mounted, is formed on a surface of the support substrate 3. Also, a V-groove-shaped optical fiber guide 9 and recessed optical device installing portions 14a and 14b are disposed around the optical waveguide fixing region 13. Further, the upper surface of the support substrate 3 except the optical waveguide fixing region 13 is covered with an oxide film 15 which has a less intimate contact property to the resin of the upper cladding layer. Device mounting benches (electron pads) 8a and 8b are formed in the respective optical device installing portions 14a and 14b to mount a light emitting device and a light receiving device.

In the optical waveguide device 1 assembled as shown in FIG. 8, the optical waveguide substrate 2 is disposed in an inversion, and the optical fiber guide 9 and the device mounting benches 8a and 8b are exposed from the optical waveguide substrate 2.

Figure 10:
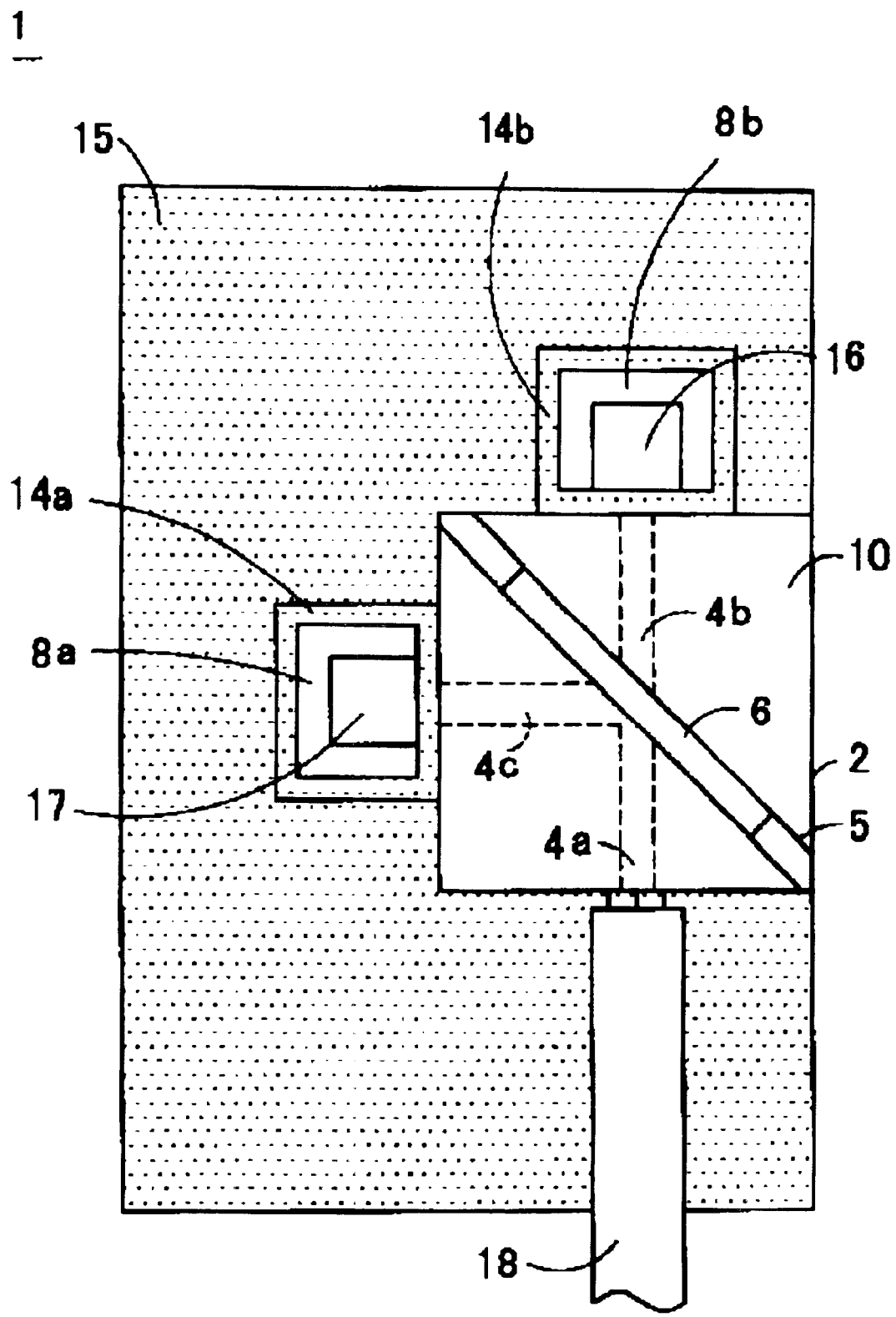
FIG. 10 shows a schematic plan view illustrating a mode of use of the optical waveguide device of FIG. 8.
Figure 11:
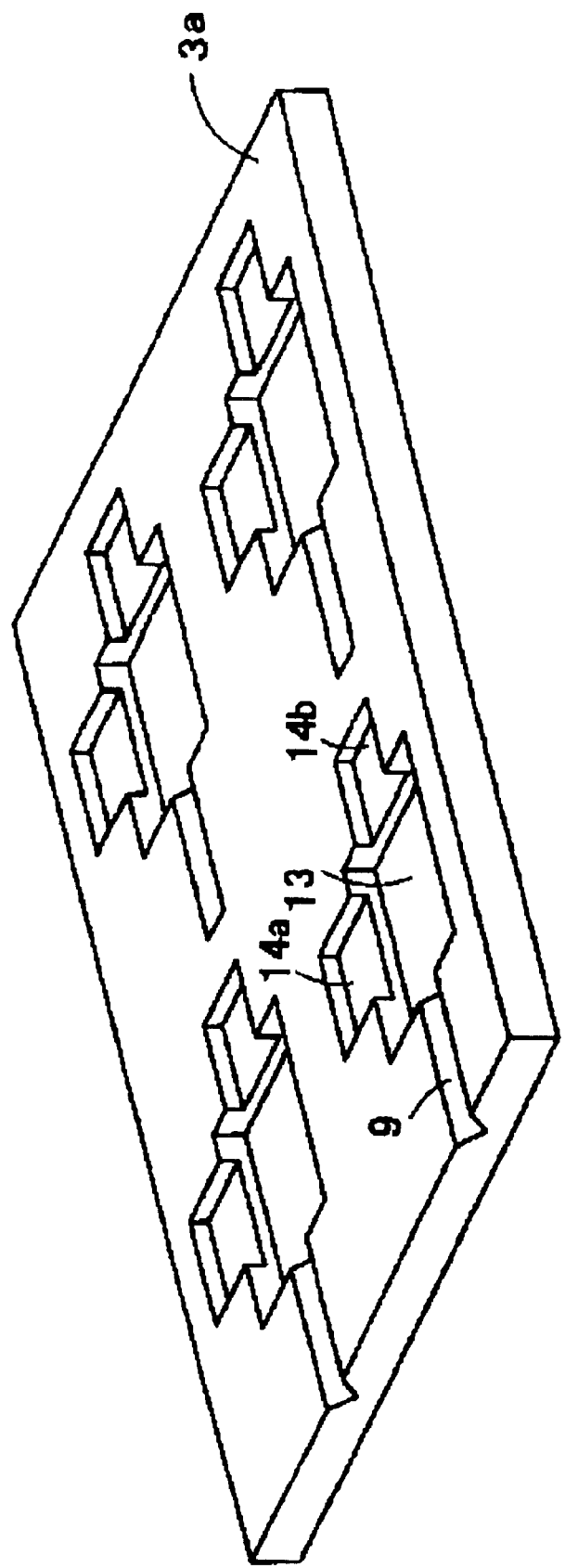

FIG. 10 shows a plan view illustrating a state in which a light emitting device 16 and a light receiving device 17 are mounted on the optical waveguide device 1, an optical fiber 18 is connected to the optical waveguide device 1. The light receiving device 17 and the light emitting device 16 are mounted in the device mounting benches 8a and 8b in the optical device installing portions 14a and 14b by die bonding lower surface electrodes. The light receiving device 17 opposes to the end surface of the core 4c and the light emitting device 16 opposes to the end surface of the core 4b. Further, the upper surface electrodes of the light emitting device 16 and the light receiving device 17 are connected to a circuit substrate and the like through bonding wires and the like. The optical fiber 18 is accommodated and positioned in the optical fiber guide 9 and fixed by a bonding agent; thereby the optical axis of the core 4a is automatically aligned with the optical axis of the optical fiber 18.

The filter 6 used in the optical waveguide device 1 has characteristics that it passes light having a wavelength outgoing from the light emitting device 16 therethrough and reflects light having a wavelength outgoing from the optical fiber 18. Accordingly, when light (a transmitting signal) is emitted from the light emitting device 16 to the core 4b, the light propagates in the core 4, passes through the filter 6, propagates in the core 4a, is incident on the optical fiber 18 and transmitted therein. Further, light (a received signal), which has propagated in the optical fiber 18, is incident on the core 4a, reflected by the filter 6, propagates in the core 4c, and then is received by the light receiving device 17. As described above, the optical waveguide device 1 can transmit and receive a signal to and from other external device connected thereto through an optical fiber.

As described above, the optical waveguide device 1 can be used as the optical transceiver for transmitting and receiving a signal and can be used in the interior of an apparatus for receiving a signal from the outside and transmitting a signal to the outside such as a personal computer connected to the Internet.

A method of manufacturing the optical waveguide device 1 will be explained with referring to FIGS. 11 to 17. First, a surface of a silicon substrate 3a, which is a mother substrate of the support substrate 3, is etched, and a plurality of sets each including an optical waveguide fixing regions 13, optical device installing portions 14a and 14b, and an optical fiber guides 9 are formed on the silicon substrate 3a so that respective sets are disposed at the same interval lengthwise and crosswise. The silicon substrate 3a of FIG. 11 has a size of 24 mm×8 mm, and four optical waveguide devices 1 can be manufactured at a time by using the silicon substrate 3a. Accordingly, each optical waveguide device 1 has a size of 12 mm×4 mm. If a silicon substrate 3a having a size larger the above size is used, a larger number of the optical waveguide devices 1 can be manufactured at a time.

Figure 12:
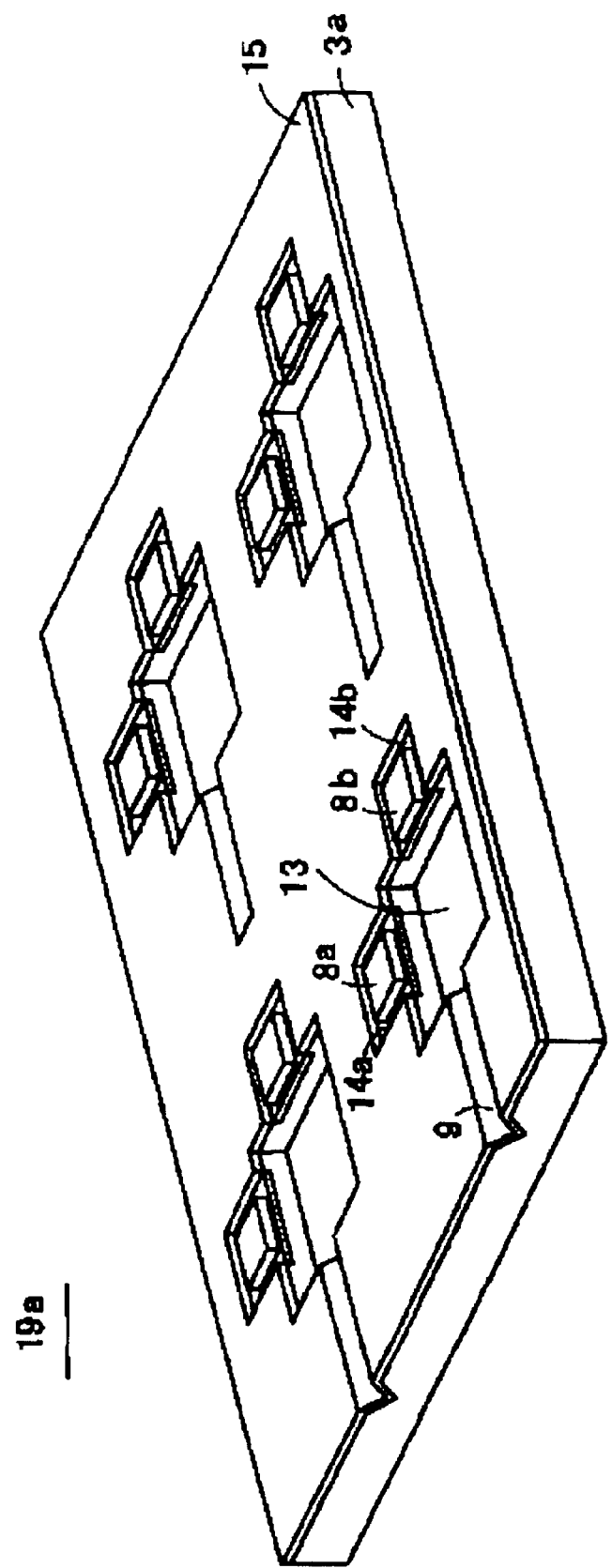

Next, as shown in FIG. 12, the oxide film 15, which has the less intimate contact property with the resin of the upper cladding layer, is formed on the surface of the silicon substrate 3a except the optical waveguide fixing region 13. Further, in the optical device installing portions 14a and 14b, the device mounting benches 8a and 8b composed of an electrode material are formed respectively on the oxide film 15. Hereinafter, the silicon substrate 3a on which the oxide film 15 is formed is referred to as a base substrate 19a.

Figure 13:
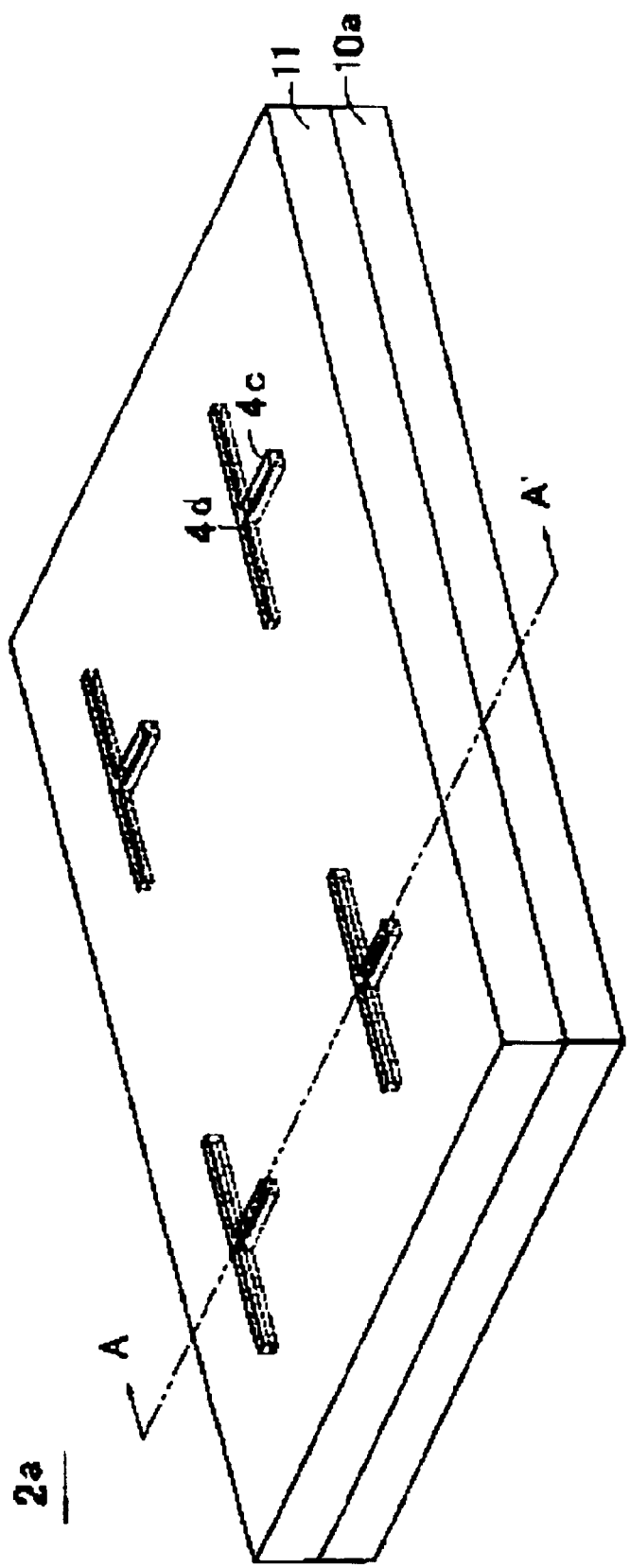

In contrast, an optical waveguide mother substrate 2a composed of a lower cladding layer 11 and cores 4c and 4d shown in FIG. 13 are formed by a duplicating method (stamper method) using a glass substrate 10a having an area as large as or larger than that of the silicon substrate 3a. The glass substrate (wafer) 10a acts as a mother substrate of the cover glass 10 of the optical waveguide device 1.

The duplicating method (stamper method) using an ultraviolet curing resin will be briefly explained here using FIG. 14. FIGS. 14A, 14B, 14C, and 14D show a surface corresponding to the A-A' cross section of FIG. 13. First, as shown in FIG. 14A, an uncured ultraviolet curing resin (lower cladding resin) 11a is dropped onto the glass substrate 10a, and after core grooves 21 are formed thereon by pressing the resin 11a against surface of the glass substrate 10a with a stamper (mold) 20a having patterns similar to the shapes of the cores 4c and 4d, the resin 11a is cured by irradiating ultraviolet rays thereto, thereby the lower cladding layer 11 having the core grooves 21 as shown in FIG. 14B is molded.

Figure 14A:
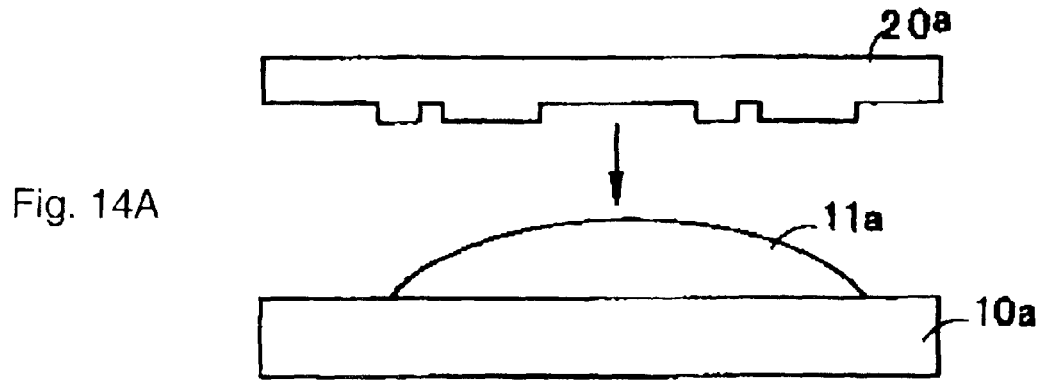
FIGS. 14A, 14B, 14C, and 14D show views explaining processes up to a process for manufacturing cores with respect to the A-A' cross section of FIG. 13.
Figure 14B:
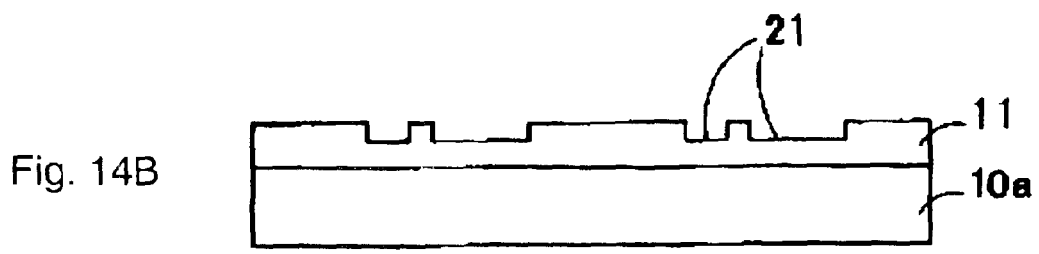
Figure 14C:
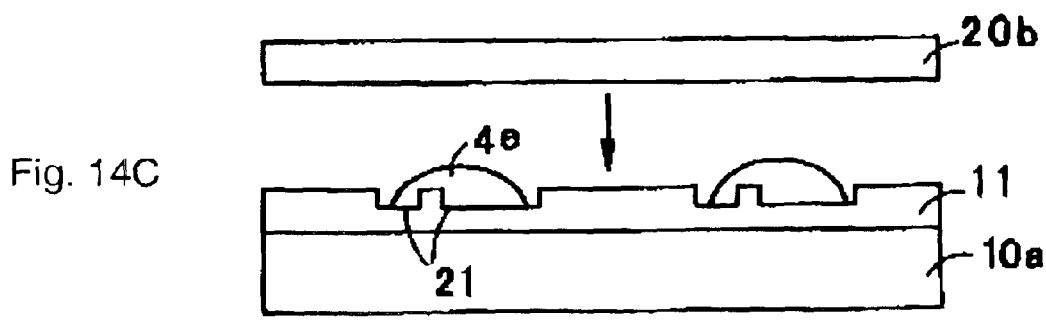
Figure 14D:
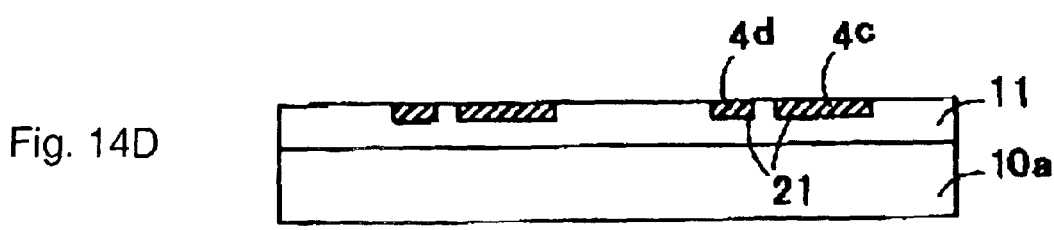

Next, an uncured ultraviolet curing resin (core resin) 4e, which has a refractive index larger than that of the lower cladding layer 11, is poured into the core grooves 21 molded in the lower cladding layer 11. The resin 4e is pressed with a stamper 20b so that the surface of the resin 4e is made flat and the thickness of a burr formed on the surface of the lower cladding layer 11 by the resin 4e which overflows the core grooves 21 is made thin. Then the resin 4e is cured by being irradiated with ultraviolet rays, thereby the cores 4c and 4d as shown in FIG. 14D is formed in the core grooves 21.

Figure 15:
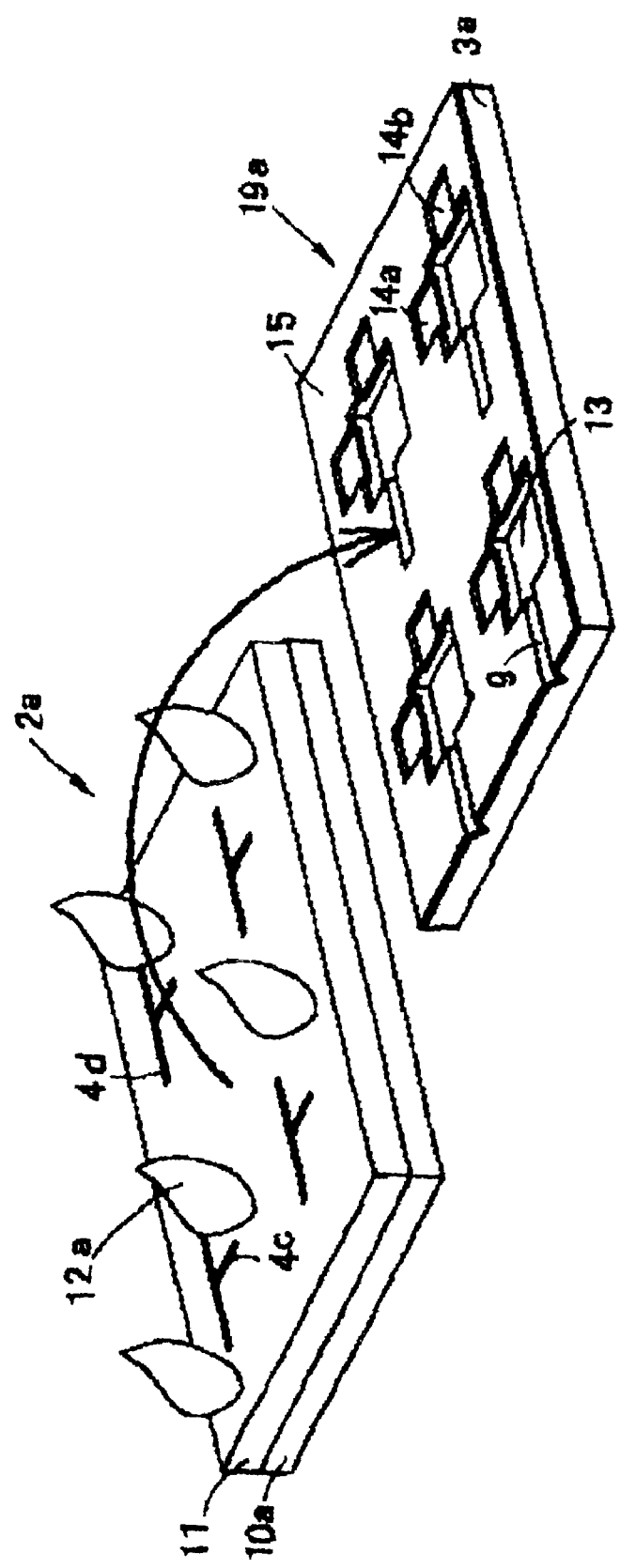

Next, as shown in FIG. 15, an uncured resin 12a is dropped onto the surface of the optical waveguide mother substrate 2a, and the optical waveguide mother substrate 2a is bonded to the base substrate 19a through the resin 12a. Note that since the resin 12a is arranged as the upper cladding later 12 when it is cured, it is preferable that the resin 12a is the same ultraviolet curing resin as that of the lower cladding layer 11 or a resin having a refractive index as large as that of the lower cladding layer 11, and the refractive index of the resin 12a must be at least smaller than that of the cores 4c and 4d.

When the base substrate 19a is bonded to the optical waveguide mother substrate 2a, the optical fiber guide 9 and the optical device installing portions 14a and 14b must be accurately aligned with the cores 4c and 4d. For this purpose, the optical waveguide mother substrate 2a is bonded to the base substrate 19a by being accurately aligned with each other using alignment marks provided therewith. In case that the base substrate 19a having a large area is aligned with the optical waveguide mother substrate 2a having a large area, there is not a troublesome job for aligning respective components with each other, which permits the plurality of cores to be effectively aligned with the fiber guide and the like accurately at a time.

Figure 16:
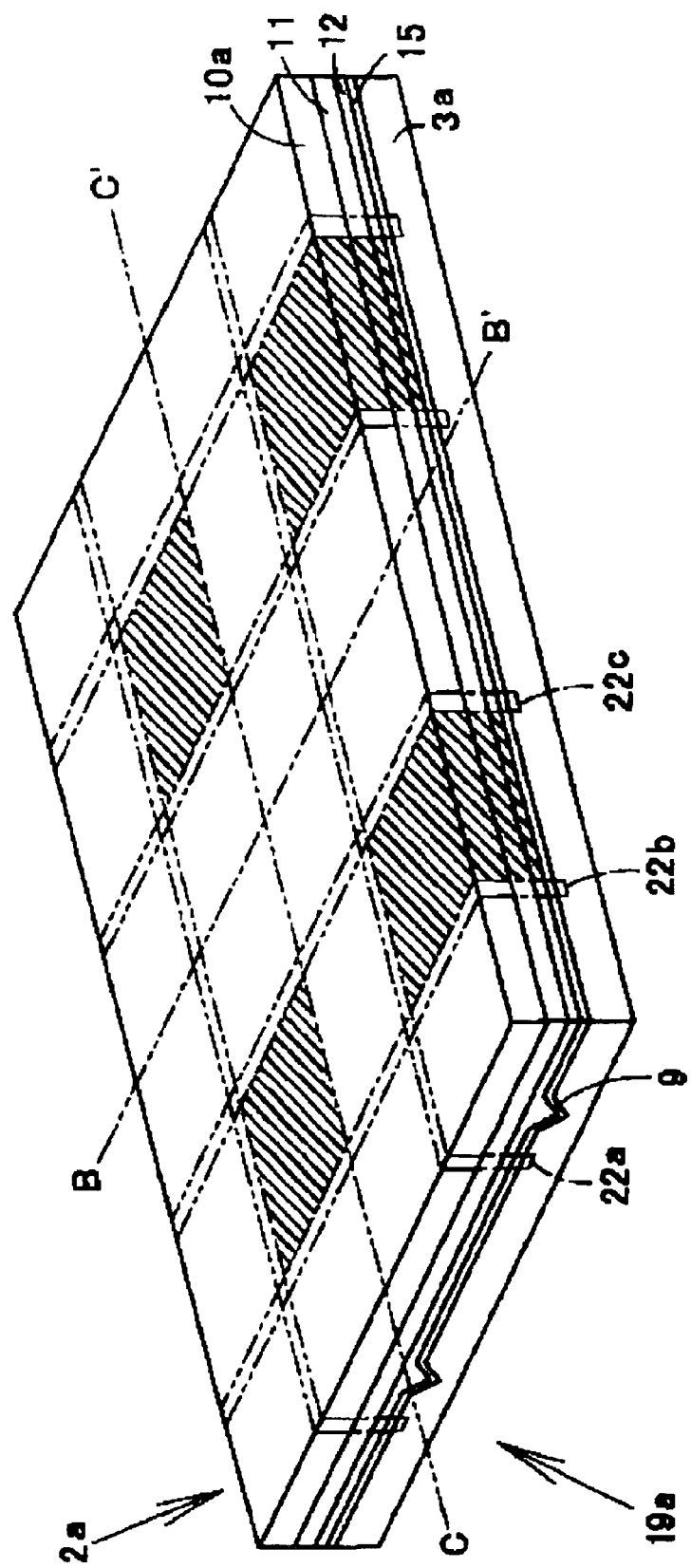

Next, as shown in FIG. 16, the base substrate 19a and the optical waveguide mother substrate 2a are disposed with the former one located on a lower side and the latter one located on an upper side, and separation grooves 22a, 22b, and 22c are formed by forming cuts in the optical waveguide mother substrate 2a by a dicing blade so that the cuts pass through the edges of the optical waveguide fixing regions 13. Incidentally, the end surfaces of the cores 4c and 4d are simultaneously formed in the cutting process of the separation grooves 22a, 22b, and 22c. In the region (region outside of the optical waveguide fixing region 13) in which the oxide film 15 is formed on the surface of the base substrate 19a of the optical waveguide mother substrate 2a divided by the separation grooves 22a to 22c, an intimate contact force is low at the boundary between the oxide film 15 and the upper cladding later 12. Thus, force is applied to an unnecessary portion (region corresponding to the outside of the optical waveguide fixing region 13) from inside of the divided optical waveguide mother substrate 2a, and the unnecessary portion can be easily exfoliated from the base substrate 19a. Therefore, only the regions, which are shown by slanted lines in FIG. 16 and in which the cores 4c and 4d are formed, can be remained (these regions correspond to the optical waveguide substrates 2), and the optical fiber guide 9 of the base substrate 19a and the device mounting benches 8a and 8b in the optical device installing portions 14a and 14b can be exposed. The respective end surfaces of the cores 4c and 4d are exposed on the outer peripheral surface of the optical waveguide substrate 2 remaining on the base substrate 19a.

Figure 17:
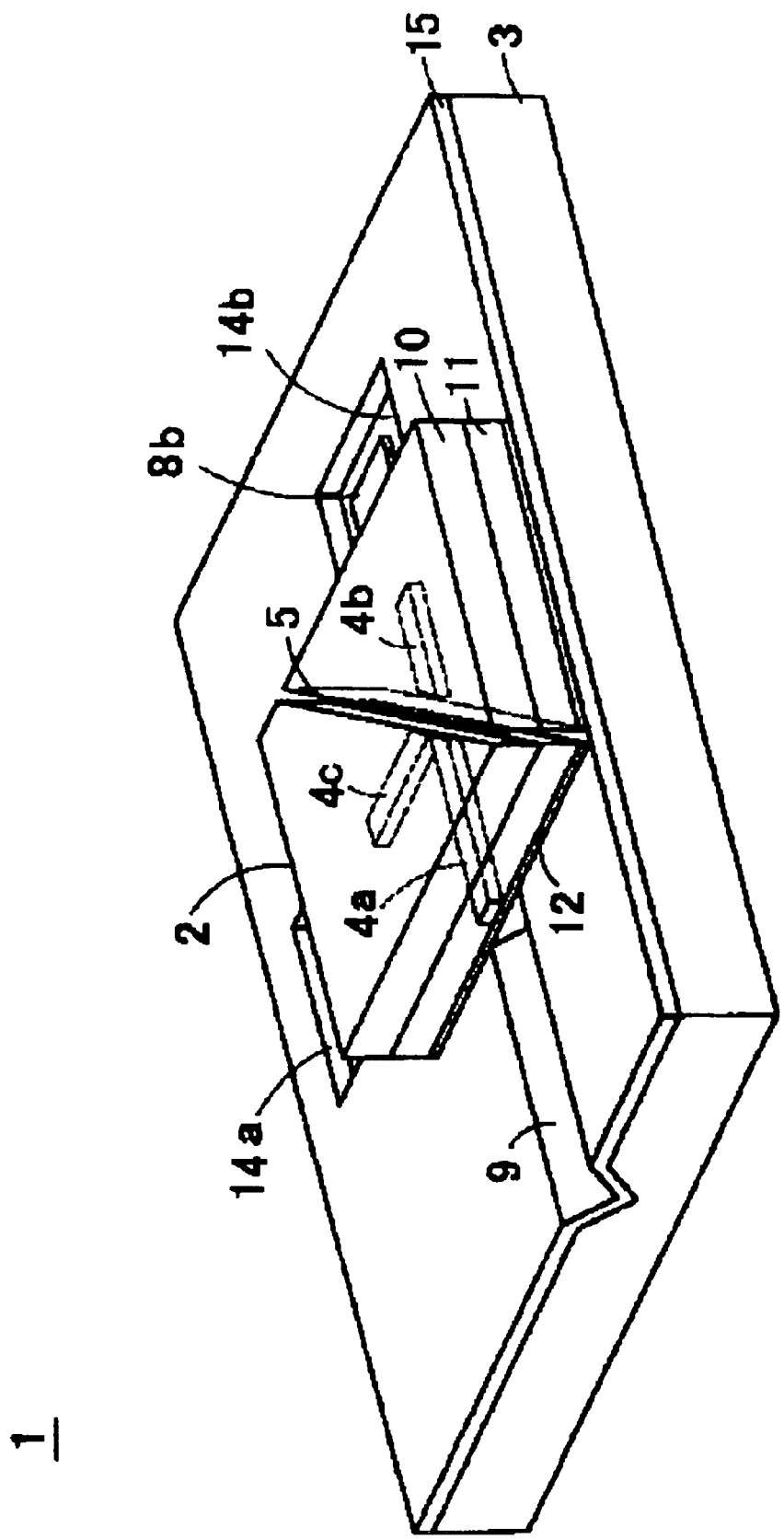

Next, the filter insertion grooves 5 are formed by making cuts in the cover glass 10 and the lower cladding layer 11 by a dicing blade tilted at an angle of 45° to the lengthwise direction of the cores 4d. At this time, since each optical waveguide device 1 has the size of 12 mm×4 mm, portions other than the target portions of the cores 4d of other optical waveguide devices 1 are not divided by setting a dicing pitch to about 2.8 mm by making an inverse operation from the expressions (1) and (2). The core 4d is divided by the thus formed filter insertion groove 5, and the cores 4a and 4b are formed thereby. Thereafter, the base substrate 19a is cut off along the B-B' and C-C' lines of FIG. 16 and divided into chips as shown in FIG. 17. Finally, the optical waveguide device shown in FIG. 8 is completed by inserting the filter 6 composed of a multi-layer reflection film into the filter insertion groove 5 located between the core 4a and the core 4b. The filter 6 may project from the upper surface of the cover glass 10.

In the optical waveguide device 1, the optical waveguide mother substrate 2a having the large area is bonded to the base substrate 19a having the large area through the upper cladding later 12, the filter insertion grooves 5 are formed, and the thus bonded member is divided into the respective chips each constituting the optical waveguide device 1 in the final process. Accordingly, the optical waveguide device 1 can be manufactured more effectively as compared with a case in which optical waveguide substrates 2 are bonded to support substrates 3, individually, and thus this manufacturing method is suitable for mass production. The filter insertion grooves 5 can be formed at a time in a process before the respective optical waveguide devices 1 are cut off by appropriately setting the length of the core 4d and the dicing pitch from the outside shape of the optical waveguide device 1, thereby production efficiency can be improved. Further, since the optical waveguide mother substrate 2a having the large area is aligned with the base substrate 19a having the large area, they can be aligned with each other more accurately as compared with a case in which small components are aligned with each other.

Further, in the optical waveguide device 1, the optical fiber guide 9 and the optical device installing portions 14a and 14b must be finally exposed. However, since the oxide film 15 is previously formed on the base substrate 19a in the region corresponding to the unnecessary portion of the optical waveguide mother substrate 2a and the bonding force of the bonding resin 12a (upper cladding later 12) is weakened, even if the optical waveguide mother substrate 2a is bonded to the base substrate 19a through the overall surfaces thereof, the unnecessary portion of the optical waveguide mother substrate 2a can be simply removed, thereby the manufacturing processes can be more simplified.

An optical communication apparatus using the optical waveguide device 1 will be explained below. In an optical network system, although user networks in individual households and the like need be connected to a transit network through access networks (subscriber optical fibers), an optical network unit for executing optical-electric conversion need be interposed between the access network and the user net work. Further, an optical line terminal is necessary in a switching station (equipment center of a phone institution) between the access networks and the transit network to execute the optical-electric conversion.

Figure 18:
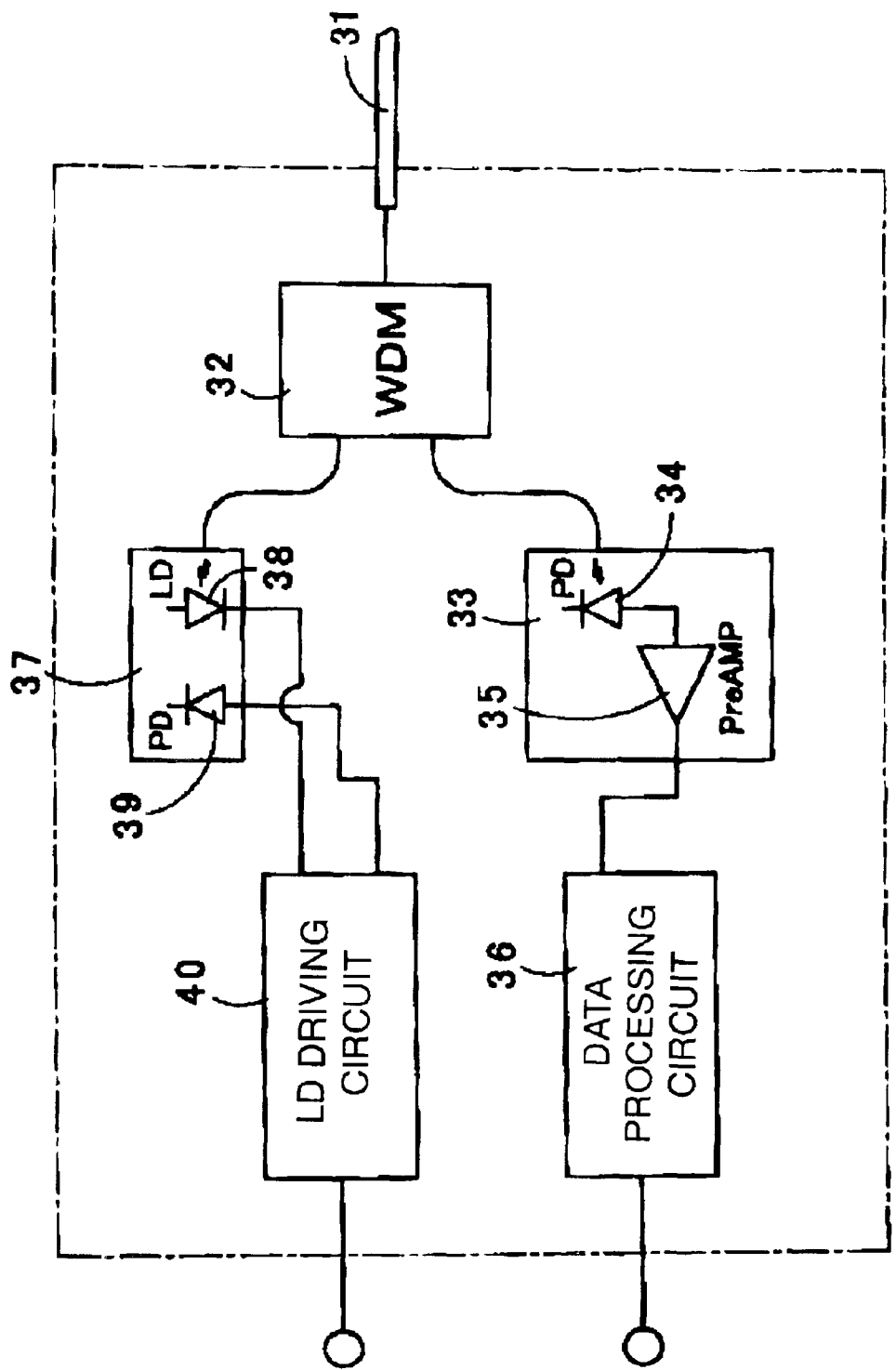
FIG. 18 shows a block diagram showing an arrangement of an optical network unit.

FIG. 18 shows a block diagram showing an arrangement of the optical network unit. Reference numeral 31 denotes an optical fiber constituting the access network and transmits optical signals in wavelength bands of 1550 nm and 1310 nm. A WDM 32 is disposed at a position facing the end surface of the optical fiber 31. The WDM 32 outputs an optical signal in the wavelength band of 1550 nm, which is transmitted from the optical fiber 31, from its output terminal and couples an optical signal in the wavelength band of 1310 nm, which is input from its input terminal, with the optical fiber 31.

The optical signal in the wavelength band of 1550 nm, which is output from the output terminal of the WDM 32, is supplied to an optical-electric conversion module (PIN-AMP module) 33. The optical-electric conversion module 33 is composed of a light receiving device (photodiode) 34 and a preamplifier 35. The optical-electric conversion module 33 converts the optical signal supplied thereto into an electric signal by receiving the optical signal by the light receiving device 34. Then, the electric signal is amplified by the preamplifier 35 and supplied to a data processing circuit 36. Next, the electric signal, which has been processed by the data processing circuit 36, is supplied to a phone connected to an optical network unit, a controller of a household electric appliance, and the like.

In contrast, an electric-optic conversion module 37 connected to the input terminal of the WDM 32 is composed of a light emitting device (LD) 38 and a monitor light receiving device 39. The light emitting device 38 emits light in a wavelength band of 1310 nm and is driven by a light emitting device drive circuit 40. Further, the electric-optical conversion module 37 controls an output such that the power of the optical signal outgoing from the light emitting device 38 is made constant on the basis of the optical signal received by the monitor light receiving device 39. Therefore, the electric signal, which is supplied from the phone and the household electric appliance, is sent to the light emitting device drive circuit 40 and converted into an optical signal by driving the light emitting device 38 by the electric signal, and the optical signal is transmitted to the optical fiber 31 through the WDM 32.

The size of the optical network unit described above can be reduced using the optical waveguide device. For example, the filter 6 and the cores 4a, 4b, and 4c in the optical waveguide device (optical transceiver) 1 described in FIG. 8 and subsequent figures can be used as the WDM 32, the light receiving device 17 mounted on the optical waveguide device 1 can be used as the light receiving device 34 of the optical-electric conversion module 33, and the light emitting device 16 mounted on the optical waveguide device 1 can be used as the light emitting device 38 of the electric-optic conversion module 37. Further, the optical network unit can be arranged as a one-chip device by mounting the preamplifier 35, the data processing circuit 36, the monitor light receiving device 39, the light emitting device drive circuit 40, and the like on the support substrate 3 of the optical waveguide device 1.

Incidentally, although the case of the optical network unit (ONU) has been explained here, the optical waveguide device 1 can be also used in the optical line unit (OLT) likewise.

According to the method of manufacturing the optical waveguide device of the present invention, even if the filter insertion grooves are formed in the state in which a plurality of the optical waveguide devices are disposed in matrix, the respective optical waveguide devices can be formed in the same shape, and the filter insertion grooves formed in the respective optical waveguide devices do not divide portions other than the target portions of other optical waveguide devices. Accordingly, since this manufacturing method can simplify the manufacturing processes and is suitable for mass production, thereby manufacturing cost can be suppressed.

While the invention has been described with respect to a limited number of embodiments, those who skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for manufacturing an optical waveguide device, the method comprising:

disposing a plurality of optical waveguides on a first substrate in a matrix, each of the plurality of optical waveguides comprising a core having a selected number of branch points N for propagating light, and a cladding layer surrounding the core, wherein each length of sides of each grid in the matrix being X and Y, and a length of the core extending in the X direction being Z;

disposing a plurality of functional portions on a second substrate;

joining the first substrate and the second substrate together so that each of the plurality of optical waveguides opposes to a respective one of the functional portions;

forming a plurality of grooves at each of the branch points, the distance between the grooves being P and an angle of each of the grooves being θ (0°<θ<90°), such that the following formulas are satisfied:

$X = M \cdot P / \sin \theta$ (where $M$ is natural number)

$Y = P / \cos \theta$ $Z \leq (N+1) \cdot P / \sin \theta$; and dividing the joined first and second substrate to a respective optical waveguide device.

2. An optical waveguide device manufactured by the method for manufacturing the optical waveguide device according to claim 1.

3. An optical communication apparatus comprising:

the optical waveguide device according to claim 2, wherein the optical waveguide device having a light emitting device and a light receiving device;

a light emitting device drive circuit for driving the light emitting device; and a data processing circuit for processing a signal output from the light receiving device.

4. The method according to claim 1, further comprising inserting a plurality of optical filters in the plurality of grooves respectively.

5. A method for manufacturing an optical waveguide, the method comprising:

disposing a plurality of optical waveguides on a first substrate in a matrix, each of the plurality of optical waveguides comprising a core having a selected number of branch points N for propagating light, and a cladding layer surrounding the core, wherein each length of sides of each grid in the matrix being X and Y, and a length of the core extending in the X direction being Z;

forming a plurality of grooves at each of the branch points, the distance between the grooves being P and an angle of each of the grooves being θ (0°<θ<90°), such that the following formulas are satisfied:

$$X = N \cdot P / \sin \theta$$

$$Y = P / \cos \theta; \text{ and}$$

dividing the first substrate to a respective optical waveguide.

6. An optical waveguide manufactured by the method for manufacturing the optical waveguide according to claim 5.

7. The method according to claim 5, further comprising inserting a plurality of optical filters in the plurality of grooves respectively.

* * * * *